United States Patent [19]

van de Polder et al.

[11] Patent Number: 4,633,295
[45] Date of Patent: Dec. 30, 1986

[54] COLOR TELEVISION TRANSMISSION AND DATA STORAGE SYSTEM, RESPECTIVELY WITH TIME-DIVISION MULTIPLEX ENCODING AND DATA GENERATOR AND DATA RECEIVER SUITABLE THEREFOR

[75] Inventors: Leendert J. van de Polder; Sing L. Tan, both of Eindhoven, Netherlands

[73] Assignee: U.S. Philips Corporation, New York, N.Y.

[21] Appl. No.: 585,317

[22] Filed: Mar. 1, 1984

[30] Foreign Application Priority Data

Mar. 22, 1983 [NL] Netherlands ......................... 8301013

[51] Int. Cl.4 ..................... H04N 11/06; H04N 11/20; H04N 11/04
[52] U.S. Cl. ........................................ 358/12; 358/11; 358/13
[58] Field of Search ..................... 358/13, 12, 11, 147

[56] References Cited

U.S. PATENT DOCUMENTS 4,335,393 6/1982 Pearson ........................... 358/12 X
4,449,143 5/1984 Dischert et al. ....................... 358/11

*Primary Examiner*—John W. Shepperd
*Assistant Examiner*—Michael P. Dunnam
*Attorney, Agent, or Firm*—Thomas A. Briody; William J. Streeter; Edward W. Goodman

[57] ABSTRACT

Color television transmission and data storage system, respectively, with time-division multiplex encoding. A signal source is coupled via an encoding circuit for time-division multiplex encoding and signal compression to a transmission and storage channel, respectively to which a data receiver having a complementary decoding circuit is connectable. Luminance information associated with a number of p line periods is transmitted substantially non-compressed. A portion of the chrominance information associated therewith is transmitted in considerably compressed form in a number of q further line periods. In this situation there is an average chrominance time compression factor which is substantially equal to or less than q/p. On display, p lines are displayed with substantially the full bandwidth for the luminance and a limited chrominance bandwidth which is inherent to the time compression. The channel is then used optimally to obtain a high picture quality on display.

10 Claims, 4 Drawing Figures

COLOR TELEVISION TRANSMISSION AND DATA STORAGE SYSTEM, RESPECTIVELY WITH TIME-DIVISION MULTIPLEX ENCODING AND DATA GENERATOR AND DATA RECEIVER SUITABLE THEREFOR

BACKGROUND OF THE INVENTION

The invention relates to a color television transmission and data storage system, respectively, with time-division multiplex encoding, the system comprising a data generator, at least one data receiver and a transmission or data storage channel, respectively, arranged between the generator and the receiver, this data generator comprising a signal source for producing signals containing luminance, chrominance, synchronizing and identification information and an encoding circuit for time-division multiplex encoding of at least a portion of the signals, after having been or not having been subjected to time compression, this encoding circuit having an output for supplying a time-division multiplex encoded signal for transmission via the transmission channel or storage in the data storage channel, respectively, the data receiver comprising a decoding circuit coupled to the channel and being, as it is, in essence, complementary to the encoding circuit, suitable for supplying signals containing at least luminance and chrominance information which largely corresponds to the data produced by the signal source in the data generator, and to a data generator and data receiver suitable therefor.

Such a system for, more specifically, transmission is described in a public report "Experimental and Development Report 118/82", published by the English "Independent Broadcasting Authority", (I.B.A.), entitled "*MAC; A television System for High-Quality Satellite Broadcasting*". The report describes several variants of a so-called MAC (Multiplexed Analogue Component) picture coding. As can be seen from a Table on page 9 of the report, it holds for all the variants that in the data generator, which is in the form of a transmitter, the luminance and the chrominance information are each subjected to time compression, the time compression for the chrominance information being twice as large. Of the chrominance information, which comprises two components per line period, one of the two is alternately contained in the time-compressed form in the time-division multiplex encoded signal. In this signal the luminance information associated with each line period is present in the timecompressed form. The report mentions the factors ⅔ and ¾ for the time compression for the luminance information and time compression factors equal to ⅓ and ⅜ for the chrominance information. The picture information per line period in the time-division multiplex encoded signal is sequentially composed from the time-compressed luminance information and one of the two time-compressed chrominance information components associated therewith.

In the receiver, the time-division multiplex encoded signal is derived from the signal received via the transmission channel, more specifically, the satellite connection, and applied to the complementary decoding circuit which, with the aid of the synchronizing and identification information, produces a time decompression for the luminance and the chrominance information and then repeatedly supplies the decompressed chrominance information over the next line period.

In the transmission channel which, in this example, is a satellite connection, there is a limited bandwidth for the transmission of the picture data. Depending on the proposed variation, bandwidths of 8.4 MHz, 7.5 MHz, and 6.0 MHz are mentioned in the report. For the transmission channel bandwidth of 8.4 MHz a time compression factor of ⅔ is proposed for the luminance information, so that for the bandwidth of the non-compressed luminance information, a bandwidth of 5.6 MHz is obtained. For the available picture data channel bandwidths of 7.5 and 6.0 MHz, a luminance time compression factor of ¾ is proposed and for the bandwidths of the non-compressed luminance information, the values of 5.6 MHz and 4.5 MHz result. It has been found that for the proposed variants with the limited transmission channel bandwidth at the proposed structure of the time division multiplex encoded signal to be transmitted, frequency limitation for the luminance and the chrominance information are required.

In the foregoing, a transmission channel in a form of a satellite connection is mentioned by way of example. The frequency limitations required for the data transmission with limited bandwidth also occur with a data storage channel having a limited bandwidth. Such a storage channel comprises data storage and data reproducing equipment, such as, for example, tape and record recording and reproducing devices.

SUMMARY OF THE INVENTION

The invention has for its object to provide a color television transmission and data storage system, respectively, with time-division multiplex encoding, this channel, with its limited (picture transmission) bandwidth being used optimally for the picture luminance transmission or storage, respectively. According to the invention, a color television system is characterized in that the encoding circuit is suitable for supplying from its output a time-division multiplex encoded signal which contains during a number of p line periods of a field period, the luminance information substantially non-compressed and during a number of q other line periods compressed chrominance information associated with this luminance information and comprising in numbers of ½q line periods of a field period, always one out of two compressed chrominance information components occurring in each line period, a number (p+q) being less than a number of m line periods which form a field period, the chrominance information being, on average, compressed in relation to the luminance information by a factor which is substantially equal to or less than q/p.

The option to transmit or store, respectively, the luminance information with substantially its maximum bandwidth, that is to say with substantially no time compression, and to subject only the chrominance information to considerable bandwidth-limiting time compression results, on display of the decoded signals on a display screen, in an optimum picture quality.

The transmission or storage, respectively, of the luminance information and of half the associated chrominance information, which together are associated with the p consecutive line periods, results on display in a reduction of the picture height compared with the display of information associated with the field periods containing m line periods, the picture height corresponding to 0.92 m line periods. In television standards wherein m=312.5 or m=262.5 line periods per field period, a field blanking period which comprises 0.08 m line periods, or 25 or 21 line periods, respectively, is namely prescribed.

The choice of the number p and the number q of line periods depends on requirements as regards the shape of the displayed picture and the picture quality which, in the event of non-compressed transmission or storage of the luminance information, respectively, now depends particularly on the chrominance information time compression associated with a bandwidth limitation. A higher height on display requires an increased time compression, resulting in a smaller bandwidth for the chrominance information and consequently a poorer picture quality. In practice, it has been found that an acceptable picture quality is obtained on display when the bandwidth of the chrominance information is limited to ¼ part of that of the luminance information.

An embodiment of a system according to the invention in which, on display, a highest possible picture height is closely associated with an acceptable picture quality, is characterized in that for the time compression factor q/p, it holds that $q/p = \frac{1}{4}$, wherein p is less than 4/5 m.

In this embodiment of the system, it can be calculated that in a standardized television system wherein m=312.5 line periods per field period, p=248 line periods can be chosen for the number p, while for a standardized system wherein m=262.5 line periods per field period, p=208 line periods can be chosen for the number p.

A further wish may be to arrive, starting from a predetermined picture width-height or aspect ratio when the signals produced by the signal source are immediately displayed, at a different predetermined ratio on display after transmission or data storage, respectively. Thoughts may then go towards television systems operating with a picture aspect ratio equal to 4:3, in which after a movie picture-television conversion (telecine), picture data are transmitted which are obtained from a movie picture having a picture aspect ratio equal to 5:3. In addition, it has been proposed to use the last-mentioned ratio in high-resolution television systems.

An embodiment of a system according to the invention, which is suitable for the desired change in the aspect ratio, is characterized in that, when a signal source construction is employed for producing signals which, on display on a display screen, have a picture aspect ratio equal to substantially 4:3 and a field blanking-field period ratio equal to 0.08, in order to obtain a picture aspect ratio equal to substantially 5:3, the number of p line periods is in the order of magnitude of the value $0.8 \times 0.92$ m=0.736 m.

A further construction of a system according to the invention, adapted to a television standard, is characterized in that, for the case in which m=312.5 line periods per field period, it holds for the number p of line periods that p=228 and for the time compression factor q/p it holds that $q/p = \frac{1}{3}$.

A further embodiment, adapted to a different television standard, is characterized in that, for the case in which m=262.5 line periods per field period, it holds for the number p of line periods that p=192 and for the time compression factor q/p it holds that $q/p = \frac{1}{3}$.

Both choices for the number p of line periods (228 and 192) have a very small deviation from the value 0.736 m, for which, in the event in which m=312.5, it holds that p=230 and, in the event in which m=262.5, it holds that p=193.2.

In the case of a color television system having one and the same bandwidth for the chrominance information components, the most simple solution is to use the average time compression factor as a constant. For color television systems in which this is not the case, an embodiment according to the invention may be characterized in that, when a signal source is used for producing in line periods chrominance information components having different bandwidths, there are for the components, different adapted time compression factors.

A data generator of a simple construction which is suitable for use in a color television system in accordance with the invention, in which the encoding circuit for the time compression comprises memories having different write and read rates, these memories, which are connected to a control circuit for the time-division multiplex encoding operation, are readable in different time periods, is characterized in that the encoding circuit comprises a memory connected to the control circuit which memory consequently operates with the same write and read rates for the luminance information, more specifically during the number of p consecutive line periods.

A further, simple embodiment of the data generator with a minimum of change-over actions during signal processing, is characterized in that the encoding circuit comprises two memories having different write and read rates, which two memories, during two numbers of ½q consecutive line periods, are sequentially in the read mode, for the processing of the chrominance information components.

A data receiver suitable for use in a color television system according to the invention, in which the decoding circuit for the time decompression comprises memories having different write and read rates, which memories which are connected to a control circuit for the time-division multiplex decoding, can be written in different time periods, which receiver will only display the received data in the proper location in a picture, is characterized in that the decoding circuit comprises change-over circuits, as a result of which there is available in the field periods outside the number of p consecutive line periods, a black level reference information instead of the luminance and the chrominance information.

In an embodiment of a data receiver suitable for cooperation with a data generator in which a minimum number of change-over actions during signal processing are effected, is characterized in that the decoding circuit comprises two memories having different write and read rates, which two memories, during two numbers of ½q consecutive line periods, are sequentially in the write mode for the processing of the chrominance information components.

DESCRIPTION OF THE DRAWINGS

The invention will now be further described by way of example with reference to the accompanying drawings, in which.

DESCRIPTION OF THE PREFERRED EMBODIMENT

Figure 1:
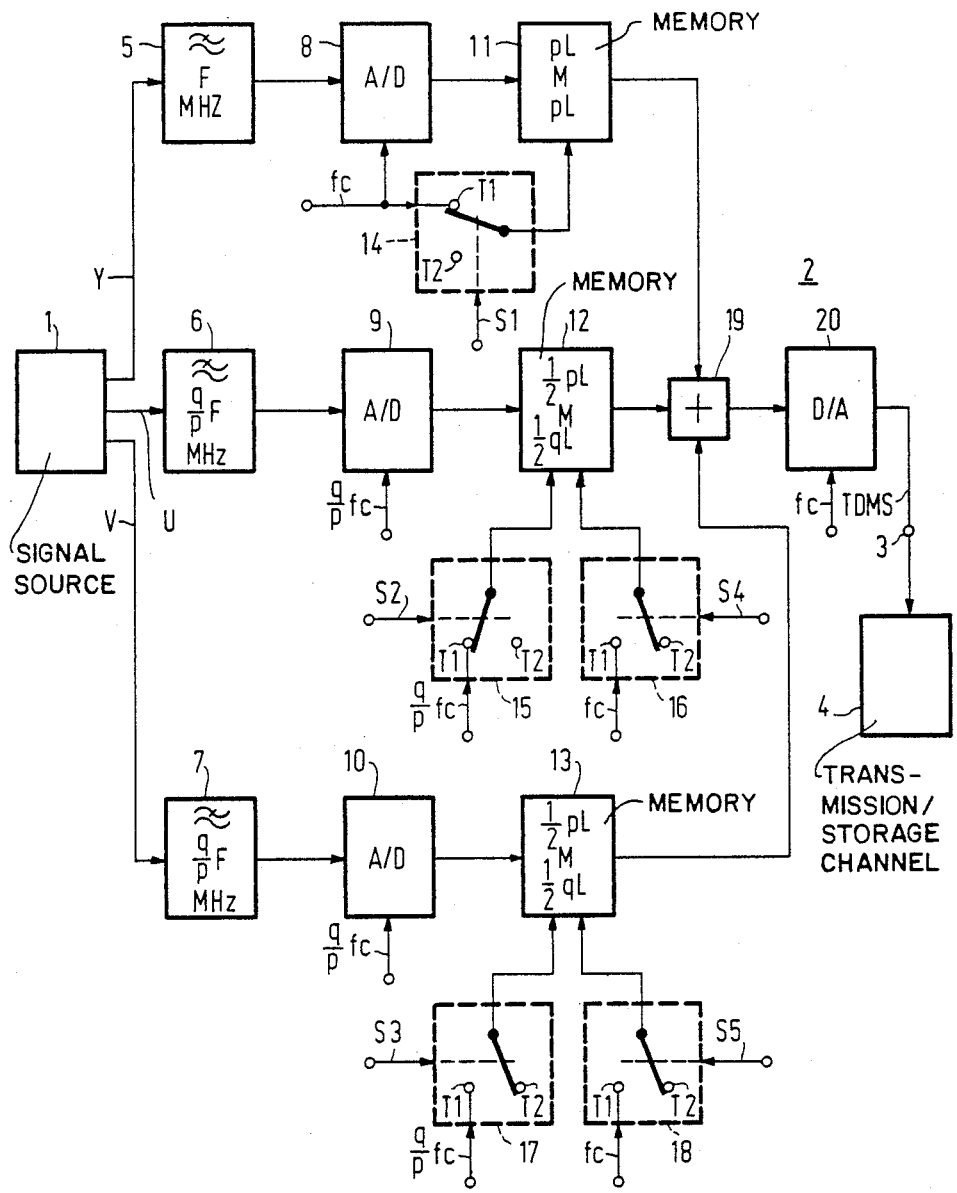
FIG. 1 illustrates, by means of a block diagram, an embodiment of a data generator suitable for use in a color television system in accordance with the invention.

In a block diagram of a color television data generator in accordance with the invention shown in FIG. 1, reference number 1 denotes a signal source which is connected to an encoding circuit 2, an output 3 of which, serving as an output of the data generator, is connected to a transmission or data storage channel 4, respectively.

When used as a transmission channel, the channel 4 may be in the form of a satellite connection, a transmitting channel on earth, a cable connection or otherwise. When used as data storage channel, the channel 4 may comprise data storage and data display equipment, such as, for example, tape and record recording and reproducing devices. The specific construction of the channel 4 is not relevant to the invention, the main point of importance being that the channel 4 has a limited bandwidth for a color television system, which bandwidth is, in accordance with the invention utilized optimally for the picture quality on display of the transmitted or stored data. Instead of being directly connected to the channel 4, the encoding circuit 2 may be connected through circuits, now shown, for the supply of further data, for example in a frequency-division multiplex system.

At the signal source 1 of FIG. 1, it is shown that it produces Y, U and V information. In a construction of the signal source 1 in the form of a color television camera, Y represents a luminance information and U and V represent chrominance information components. The luminance information Y has, for example, a bandwidth of 8.4 MHz, it then being possible for the chrominance information (U, V) to have a bandwidth of 2.1 MHz. Instead of having the same bandwidths, as is assumed for U and V, the chrominance information components may have different bandwidths. This is, for example, the case in the NTSC television standard having standardized chrominance information components I and Q having bandwidths of 1.3 MHz and 0.5 MHz, respectively. The identical bandwidths of, for example, 1.3 MHz are present in the PAL standard. For the luminance information, the values of 4.2 MHz and, for example, 5 MHz, respectively, are laid down in the NTSC and PAL standard, respectively. In FIG. 1 the signal source 1 is shown, as an example, for high resolution (or high definition) television with the indicated bandwidths for the Y, U and V-information.

In the encoding circuit 2, three low-pass filters 5, 6 and 7 are shown to which the information Y, U and V, respectively, are applied. A cut-off frequency of F MHz is indicated for the filter 5, the cut-off frequencies of the filters 6 and 7 being equal to q/p F MHz. The frequency of F MHz is, for example, also the cut-off frequency of the bandwidth allocated to color television for channel 4. The frequency of q/p F MHz is a lower frequency as for the factors q and p it holds that the factor q is the lower. By way of example, it holds that F=8.4 and $q/p = \frac{1}{4}$.

In the encoding circuit 2 the filters 5, 6 and 7 are followed by respective analog-to-digital converters (A/D) 8, 9 and 10. A clock pulse signal having a clock pulse frequency fc is applied to the converter 8. A signal having a clock pulse frequency q/p fc is applied to the converters 9 and 10. The converters 8, 9 and 10 are followed by respective memories (M) 11, 12 and 13. The memories M are in the form of digital memories which may further be random access memories, serial memories or otherwise. It holds, more specifically, for the memories 12 and 13, that they must be of a type having different write and read rates, which is not required for the memory 11.

Figure 3A:
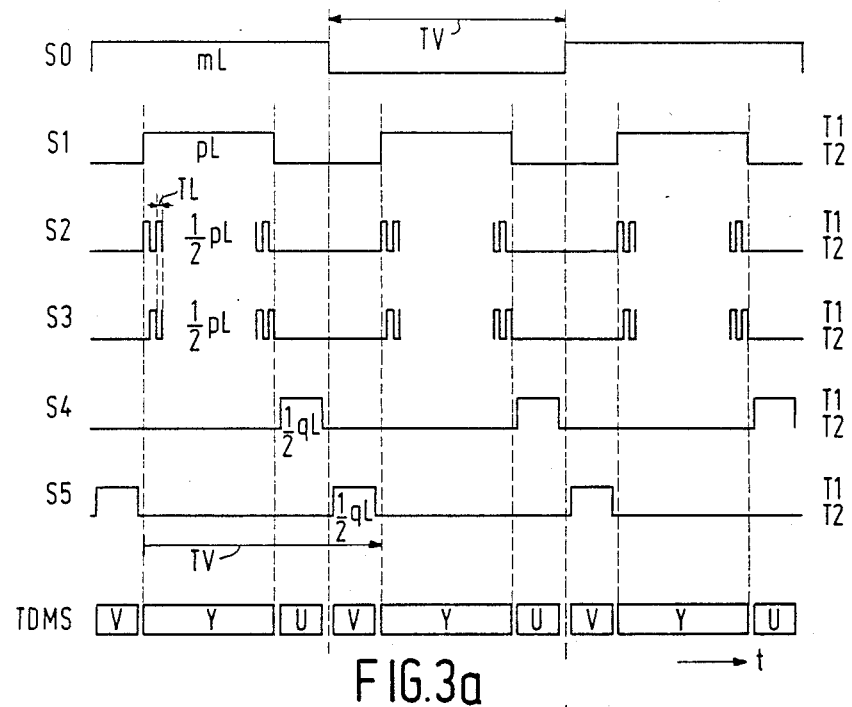
FIGS. 3a and 3b show, to illustrate the operation of the data generator of FIG. 1 and the data receiver of FIG. 2, respectively, some time diagrams of signals.

For simultaneous writing and reading of data at the memory 11, a clock pulse signal is applied thereto at the clock pulse rate fc, via a change-over circuit 14. The change-over circuit 14 and further change-over circuits still to be described are shown in the drawing, for the sake of simplicity, as mechanical change-over switches having change-over contacts T1 and T2, but in practice, they will be in the form of electronic change-over circuits. For switching the change-over circuit 14, a change-over signal S1 is applied thereto, the clock pulse signal (fc) being applied to the memory 11 at an interconnected contact T1. The contact T2 is free, so that when T2 is interconnnected, the memory 11 is stopped. In FIG. 3a possible signal variations of the change-over signal S1, as well as change-over signals S2, S3, S4 and S5 still further to be described, are plotted versus time t. Signal levels at the change-over signals S1 to S5, inclusive of FIG. 3a, are denoted by T1 and T2, which correspond to the situation in which corresponding change-over contacts are interconnected. In addition, a signal S0, being a field-synchronizing signal, and a signal TSMS, being a time-division multiplex encoded signal occurring at the output 3, are plotted in FIG. 3a. TV in the signal S0 denotes a field period. In FIG. 3a, a time delay equal to the field period TV is shown in the signal S5. The signal variations at the time scale t are plotted schematically, and are an approximation.

At the memories 12 and 13, respectively, of the encoding circuit 2 of FIG. 1, it is shown that clock pulse signal supply is effected via two change-over circuits 15, 16 and 17, 18, respectively. The change-over circuits 15 and 17 provide the clock pulse signal supply for writing data into the respective memories 12 and 13, reading the respective memories 12 and 13 at a different rate being effected via the change-over circuits 16 and 18. Under the control of the switching signals S2 and S3, respectively, a clock pulse signal having the clock pulse frequency (q/p) $f_c$ is applied via the change-over circuit 15 and 17, respectively. Under the control of the switching signals S4 and S5, respectively, a clock pulse signal having the clock pulse frequency fc is applied via the change-over circuits 16 and 18, respectively. The changeover circuits 14 to 18, inclusive, together provide a control circuit (14–18) for the memories 11, 12 and 13. Outputs of the memories 11, 12 and 13 are connected to inputs of an adder circuit 19. An output of the adder circuit 19 is connected to the output 3 via a digital-to-analog converter (D/A) 20 to which a clock pulse signal having the clock pulse frequency fc is applied. The converter 20 may be omitted when the channel 4 is suitable for the transmission or storage of digital data. Let it, however, be assumed that the channel 4 is suitable for analog signal processing.

The operation of the data generator of FIG. 1 will now be described with reference to the time diagrams shown in FIG. 3a. At the signal S1 of FIG. 3a, pL denotes a number of line periods, the fact that the contact T1 of the change-over circuit 14 of FIG. 1 is interconnected providing that memory 11 is simultaneously written and read. TL at the signals S2 and S3 denote a line period. The positions of the switches shown in FIG. 1 at the control circuit (14–18) are associated with the line period TL shown. It can be seen that in the memories 12 and 13, writing is not effected during the entire number of line periods pL, but during half this number of line periods ($\frac{1}{2}$pL). In this situation, as shown at the switching signals S2 and S3 of FIG. 3a, the chrominance information component U of one line is written into the memory 12 and the component V of the subsequent line into the memory 13 at half the line frequency and with the inverted polarity. Instead of this alternation, when identical switching signals S2 and S3 are used, the components U and V of one and the same line can be written and the components of the subsequent line may be skipped. From the signals S0, S1, S2 and S3 of FIG. 3a, it will be apparent that of a number of line periods mL comprising a field period TV, the luminance information of the number of line periods pL is written into the memory 11 and that one-half ($\frac{1}{2}$pL) of the chrominance information is written into the memories 12 and 13. Writing into the memory 11 is then effected at the clock pulse frequency fc, and into the memories 12 and 13 at the lower clock pulse frequency (q/p) fc. As a result thereof, the luminance information associated with the number of line periods pL is written into a corresponding number of line memory locations pL in the memory 11, while the chrominance information component associated with the number of line periods $\frac{1}{2}$pL is written into a number of line memory locations q/p times $\frac{1}{2}$pL=$\frac{1}{2}$qL. All this is shown at the memories 11, 12 and 13 of FIG. 1 by means of pL, qL and $\frac{1}{2}$pL, $\frac{1}{2}$qL. If, after these data have been entered, they are read at the same rate (the clock pulse frequency fc) from the memories 11, 12 and 13, the memories 12 and 13 effect a time compression. From the above-mentioned values ($\frac{1}{2}$pL to $\frac{1}{2}$qL) there, follows a time compression factor equal to q/p. At the switching signal S4 of FIG. 3a, reading of the memory 12 at the clock pulse frequency fc during the number of line periods $\frac{1}{2}$qL is shown in greater detail. The chrominance information U is then transferred to the timedivision multiplex signal TDMS of FIG. 3a. Hereafter the switching signal S5 provides a transfer of the chrominance information V. Thereafter the associated luminance information Y occurs in the signal TDMS after the time delay TV shown at the signal S5. In the signal TDMS the luminance information Y occurs unchanged, up to the cut-off frequency of F MHz, while the chrominance information (U/V), if not limited already by the filters 6 and 7, is frequency-limited by the time compression and occurs up to the cut-off frequency of q/p F MHz. FIG. 3a shows a certain structure of the signal TDMS. Time intervals containing the data U, V and Y are given as examples. In intermediate time intervals, synchronizing and identification data as well as sound data may be present in the signal TDMS. In the example given, field synchronizing data occur in the signal TDMS in field blanking periods between the data U and V, which are associated with each other.

The time-division multiplex encoded signal TDMS of FIG. 3a would, when displayed without further measures, result on a display screen in a picture having different data in predominantly three horizontal strips located in the direction of line scan. The luminance information Y of a given field period TV would (partly) occur in a central intermediate strip with the number p of line periods. The chrominance information component V belonging to the luminance information Y would occur in the top strip with the number $\frac{1}{2}$q of line periods. The chrominance information component U associated with the subsequent field period would occur in the bottom strip with the number $\frac{1}{2}$q of line periods. Thus, the chrominance information component U associated with the intermediate strip having the luminance information Y occurs at the end of the preceding field period.

Figure 2:
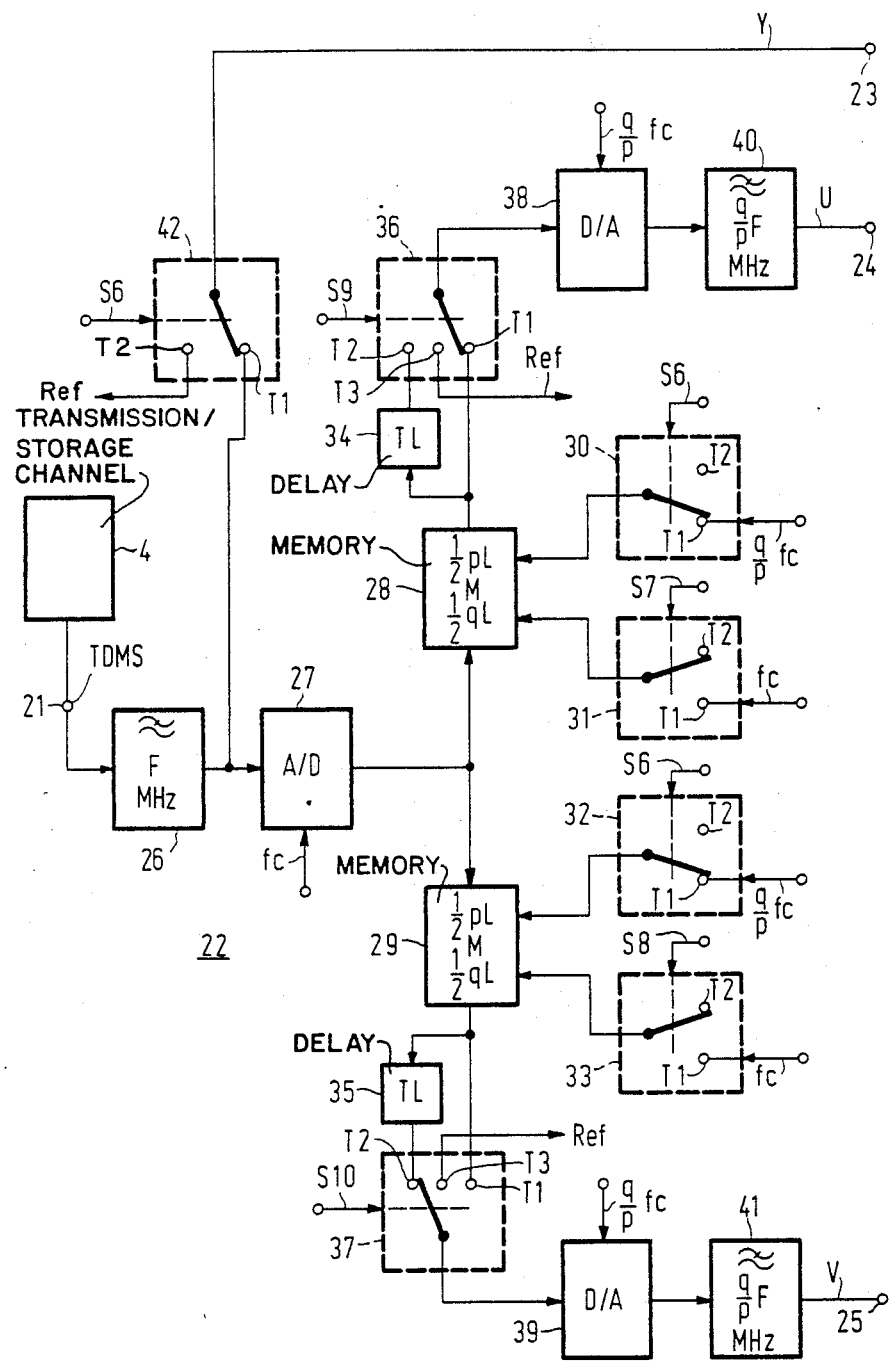
FIG. 2 illustrates an embodiment of a data receiver which is suitable for use with the data generator of FIG. 1.

FIG. 2 shows an embodiment of a data receiver which receives from the transmission or signal storage channel 4, respectively, the time-division multiplex encoded signal TDMS at an input 21 of a decoding circuit 22. The decoding circuit 22 of FIG. 2 is, as regards its operation, in essence complementary to the encoding circuit 2 of FIG. 1, that is to say that at outputs 23, 24 and 25, respectively, of the decoding circuit 22, a luminance information Y and chrominance information components U and V occur which correspond, to the best possible extent, to the portions of information components Y, U and V processed in the encoding circuit 2, as the data associated with the number of line periods pL are processed in their totality for the luminance and only half the data for the chrominance.

In the decoding circuit 22, the input 21 is connected to the input of a low-pass filter 26 having a cut-off frequency of F MHz. The filter 26 blocks higher-frequency data which may occur in the channel 4 when frequency-division multiplexing is used. The output of the filter 26 is connected to inputs of two memories 28 and 29 of the type having different write and read rates, via an analog-to-digital converter 27 to which a clock pulse signal with the frequency fc is applied. Associated with the memory 28 are two change-over circuits 30 and 31 via which a clock pulse signal is applied with a clock pulse frequency (q/p) fc and fc, respectively, for reading and writing, respectively, under the control of a switching signal S6 and S7, respectively. Likewise, two change-over circuits 32 and 33, to which the respective switching signals S6 and S8 for reading and writing are applied are connected to the memory 29. The change-over circuits 30 to 33, inclusive, form together a control circuit (30–33) for controlling a time-division multiplex decoding operation and a time decompression.

The output of the memories 28 and 29, respectively, are connected directly and via a delay devices 34 and 35, respectively, having time delays equal to a line period TL, to change-over circuits 36 and 37, respectively. The change-over circuits 36 and 37 have three change-over contacts T1, T2 and T3, the change-over being effected under the control of switching signals S9 and S10, respectively. The contact T1 is connected directly to the memory output and the contact T2 is connected to the delay device output. The contact T3 is connected to a reference data Ref. The outputs of the change-over circuits 36 and 37, respectively, are connected via digital-to-analog converters 38 and 39, respectively, to which a clock pulse signal having the frequency (q/p) fc is applied, to inputs of low-pass filters 40 and 41, respectively, each having a cut-off frequency equal to (q/p) F MHz. The output of the filters 40 and 41, respectively, are connected to the outputs 24 and 25.

The output 23 is connected to the output of a change-over circuit 42, which has two change-over contacts T1 and T2. The contact T1 is connected to the output of the filter 26 and the reference data Ref is applied to the contact T2. The reference data REF corresponds to a black level reference information in television.

Figure 3B:
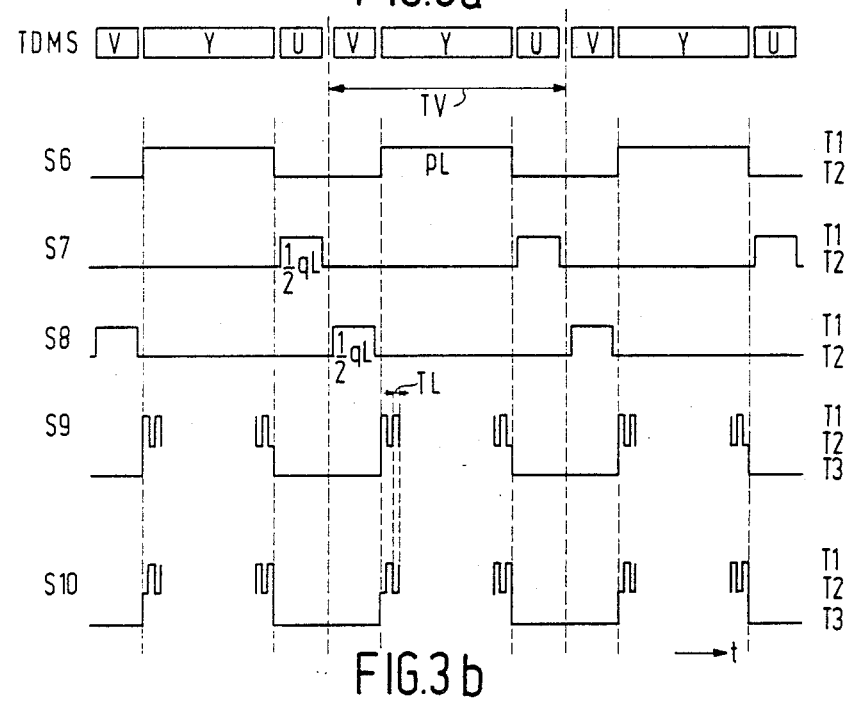

In FIG. 3b the received signal TDMS and the switching signals S6 to S10, inclusive, are plotted versus time t. The time intervals having the number of line periods pL and ½qL, shown in FIG. 3a, correspond to the time intervals shown in FIG. 3b, writing and reading having been interchanged. Thus, under the control of the signal S7, the received data U are written into the memory 28 with the clock pulse frequency fc (in the time interval ½qL). Thereafter the memory 29 is likewise filled with the data V under the control of the signal S8. Thereafter the luminance information Y becomes available at the output of the filter 26. In the time interval having the number of line periods pL shown in FIG. 3b, the change-over circuit 42 conveys the luminance information Y to the output 23, while, simultaneously, the signals S9 and S10 switch the change-over circuits 36 and 37 at half the line frequency between the contacts T1 and T2. As in FIG. 3a it is described that the signals S2 and S3 switch with the opposite polarity, this is also the case for the signals S9 and S10. FIG. 3b shows a line period TL in the signals S9 and S10, with which line period the switching positions shown in FIG. 2 are associated. The chrominance information components U and V associated with the luminance information Y occur directly and delayed by one period TL at the outputs 24 and 25.

From the signals S6, S9 and S10 of FIG. 3b and the change-over circuits 42, 36 and 37 of FIG. 2, it follows that on display on a display screen of the data Y, U and V present at the respective outputs 23, 24 and 25, a black level is present outside the number of line periods pL per field period TV. Compared with the display of 0.92 m line periods per field period TV laid down in the standards, at a picture width-height or aspect ratio of 4:3, it follows that, in the event of an unmodified display, a narrow black strip is present above and below the much wider intermediate strip of the number of line periods pL. The luminance information Y is then present in the display picture with the maximum bandwidth, which results in a display in the horizontal direction with a maximum of details. The introduction of the black level with the reference Ref prevents, on the one hand, cross-talk of information from the picture to be displayed to the upper and lower strips from occurring and, on the other hand, these strips are now available without any disturbance for the display of further data.

For the choice of the number of p and q line periods, wherein the sum p+q must be less than the number of m line periods TL forming a field period TV, different requirements may be the starting point. The bandwidth limitation introduced by the chrominance time compression then imposes an upper limit to the time compression. In practice, it has been found that on display, the picture quality is of an acceptable level when the bandwidth of the chrominance information is limited to ¼ part of the bandwidth of the luminance information. A maximum/optimum time compression factor $q/p=¼$ follows. Starting from the factor $q/p=¼$ it follows from the sum p+q that p must be less than 4/5 m. In the case of a standardized television system wherein m=312.5 line periods per field an upper limit of p=250 ensues. Then there is no room in the field period to insert field synchronizing information. Therefore a suitable choice is p=248, wherein it follows for $q/p=¼$ that q=62. In standardized television systems 0.92 m line periods are used from the m line periods per field period TV for the display of data, so that for m=312.5 it holds that 287.5 line periods are available for the display. Compared with a picture having 288 lines, it follows that at p=248 line periods, a black upper and a black lower strip of not more than 20 lines can be present on display.

For a television standard wherein m=262.5 line periods per field period TV, it follows at $q/p=¼$ that there is an upper limit of p=210. In this situation a suitable choice is p=208, it ensuing for q that q=52. Compared with the standardized picture wherein 0.92 m= 242.5 line periods, it follows, relative to the value 244, that a black upper and a black lower strip of not more than 17 lines can be present. In practice, the displayed picture comprises less than the number of lines standardized for that purpose, so that the strips will be narrower.

In the said standards, the value 4:3 has been laid down for the picture aspect ratio. Starting from a like-wise laid down field blanking-field period ratio equal to 0.08, it follows that in order to obtain a picture aspect ratio equal to substantially 5:3, the number of p line periods must be in the order of magnitude of the value 0.8 times 0.92 m=0.736 m. The picture aspect ratio equal to 5:3 fits in with wide-screen moving pictures and has been proposed for high resolution television. In the case of m=312.5 line periods per field period TV, it follows that p=230 and for the case of m=262.5 line periods per field period, it follows that p=193.2. If a time compression factor q/p equal to ¼ is opted for, the choice of p=228 and q=76 with a picture aspect ratio equal to 5.05:3 may be made for the first-mentioned case and for the second case, p=192 and q=64 with a picture aspect ratio equal to 5.03:3.

The embodiment of the encoding circuit 2 shown in FIG. 1 and the embodiment of the complementary decoding circuit 22 shown in FIG. 2 are implemented in a simple way and fit in with the structure shown in FIGS. 3a and 3b of the time-division multiplex encoded signal TDMS. Instead of the described construction in the field period TV with the sequence V, Y, U (of the subsequent picture), resulting in, as it were, three horizontal strips, the upper and lower strips may be divided, in the vertical and/or horizontal direction, for comprising the chrominance information. In addition, instead of one and the same write rate for the memories 12 and 13 for the chrominance information processing, several different write rates may be used. This holds more specifically for the NTSC system with the different bandwidths for the I and Q chrominance information components. Each component may then have its own, adapted time compression factor. The only requirement is that the average time compression factor q/p must be so great that the desired chrominance information can be compressed to fit into the number of line periods qL. The constant time compression factor described with reference to FIG. 1 is the most simple factor.

The use in the encoding circuit 2 of the memory 11 which, as described for the signal S5 of FIG. 3a, provides the time delay by the field period TV, results in that there is no need for the decoding circuit 22 to comprise more memories than the two decompression memories 28 and 29. Starting from one single data generator as the transmitter and a plurality of data receivers, it is most advantageous to have data receivers of the simplest possible construction.

What is claimed is:

1. A color television transmission and data storage system, respectively, with time-division multiplex encoding, the system comprising a data generator, at least one data receiver and a transmission channel arranged between the generator and the receiver, this data generator comprising a signal source for producing signals containing luminance, chrominance, synchronizing and identification information and an encoding circuit for time-division multiplex encoding of at least a portion of said signals, after having been subjected or not subjected to time compression, this encoding circuit having an output for supplying a time-division multiplex encoded signal for transmission via the transmission channel, the data receiver comprising a decoding circuit coupled to said transmission channel and being complementary to said encoding circuit, for supplying signals containing at least luminance and chrominance information which largely corresponds to the data produced by the signal source in the data generator, characterized in that the encoding circuit supplies from its output a time-division multiplex encoded signal which contains, during a number of p line periods of a field period, the luminance information substantially noncompressed and during a number of q other line periods, compressed chrominance information associated with this luminance information and comprising in numbers of $\frac{1}{2}$q line periods of a field period always one out of two compressed chrominance information components occuring in each line period, a number (p+q) being less than a number of m line periods which form a field period, the chrominance information being on average compressed in relation to the luminance information by a factor which is substantially equal to or less than q/p.

2. A color television system as claimed in claim 1, characterized in that for the time compression factor q/p, it holds that $q/p = \frac{1}{4}$ p being less than 4/5 m.

3. A color television system as claimed in claim 1, characterized in that when the signal source produces signals which on display on a display screen, have a picture aspect ratio equal to substantially 4:3 and a field blanking-field period ratio equal to 0.08, in order to obtain a picture aspect ratio equal to substantially 5:3, the number of p line periods is in the order of magnitude of the value of $0.8 \times 0.92$ m = 0.736 m.

4. A color television system as claimed in claim 3, characterized in that for the case in which m = 312.5 line periods per field period, it holds for the number p of line periods that p = 228 and for the time compression factor q/p it holds that $q/p = \frac{1}{3}$.

5. A color television system as claimed in claim 3, characterized in that for the case in which m = 262.5 line periods per field period, it holds for the number p of line periods that p = 192 and for the time compression factor q/p it holds that $q/p = \frac{1}{3}$.

6. A color television system as claimed in claim 1, 2 3, 4 or 5, characterized in that when a signal source is used for producing in line periods chrominance information components having different bandwidths, there are for the components different, adapted time compression factors.

7. A data generator for use in a color television system as claimed in claim 1, 2, 3, 4 or 5 the encoding circuit, for the time compression, comprising memories having different write and read rates, these memories, connected to a control circuit for the time-division multiplex encoding operation, are readable in different time periods, characterized in that the encoding circuit comprises a further memory connected to the control circuit which further memory consequently operates with the same write and read rates for the luminance information, more specifically during the number of p consecutive line periods.

8. A data generator as claimed in claim 7, characterized in that the encoding circuit comprises two memories having different write and read rates, which two memories during two numbers of $\frac{1}{2}$ q consecutive line periods are sequentially in the read mode for the processing of the chrominance information components.

9. A data receiver for use in a color television system as claimed in claim 1, 2, 3, 4 or 5, the decoding circuit for the time decompression comprising memories having different write and read rates, these memories, connected to a control circuit for the time-division multiplex decoding operation being writable in different time periods, characterized in that the decoding circuit comprises change-over circuits, as a result of which there is available, in the field periods outside the number of p consecutive line periods, a black level reference information instead of the luminance and the chrominance information.

10. A data receiver suitable for use in a color television system as claimed in claim 9, characterized in that the decoding circuit comprises two memories having different write and read rates which two memories, during two numbers of $\frac{1}{2}$ q consecutive line periods, are sequentially in the write mode, for the processing of the chrominance information components.

* * * * *